United States Patent
Rubin et al.

(10) Patent No.: US 11,650,559 B1
(45) Date of Patent: May 16, 2023

(54) SYSTEMS AND METHODS FOR DEVICE RECOMMENDATION

(71) Applicant: United Services Automobile Association (USAA), San Antonio, TX (US)

(72) Inventors: Elizabeth J. Rubin, San Antonio, TX (US); Jon C. Snyder, Spokane, WA (US); Monica Rankin, North Granby, CT (US); Ramsey Devereaux, San Antonio, TX (US); Michelle MacDonald, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 194 days.

(21) Appl. No.: 16/849,738

(22) Filed: Apr. 15, 2020

Related U.S. Application Data

(60) Provisional application No. 62/838,525, filed on Apr. 25, 2019.

(51) Int. Cl.
*G05B 19/042* (2006.01)

(52) U.S. Cl.
CPC .. *G05B 19/042* (2013.01); *G05B 2219/25011* (2013.01)

(58) Field of Classification Search
CPC .................................................. G05B 19/042
USPC ......................................................... 700/275
See application file for complete search history.

(56) References Cited

U.S. PATENT DOCUMENTS

| | | | |
|---|---|---|---|
| 11,018,939 B1* | 5/2021 | Harris | G06K 7/1413 |
| 2013/0332306 A1* | 12/2013 | Fahmy | G06Q 30/0282 |
| | | | 705/347 |
| 2016/0371762 A1* | 12/2016 | Fergis | G06Q 30/0631 |
| 2017/0322705 A1* | 11/2017 | Conway | H04L 67/12 |
| 2018/0068034 A1* | 3/2018 | Zeifman | G05D 23/1917 |
| 2019/0172164 A1* | 6/2019 | Bellino | G06Q 50/163 |

(Continued)

FOREIGN PATENT DOCUMENTS

WO    WO-2012116613 A1 *  9/2012 ............. H04L 67/16

OTHER PUBLICATIONS

US Environmental Protect Agency, "Moisture Control Guidance for Building Design, Construction, and Maintenance", EPA, EPA 402-F-13053, Dec. 2013, pp. 1-16 (Year: 2013).*

*Primary Examiner* — Mohammad Ali
*Assistant Examiner* — Joshua T Sanders
(74) *Attorney, Agent, or Firm* — Fletcher Yoder PC

(57) ABSTRACT

A controller of a computing device determines devices that are currently connected at the building. Based on the devices currently connected at the building, the controller determines recommended devices to connect and recommends the recommended devices by displaying the recommended devices on a display of the computing device. In some embodiments, the controller also determines property information of the building. The controller then determines recommended devices to connect based on the property information and/or the devices currently connected at the building. The controller recommends the recommended devices by displaying the recommended devices on the display of the computing device. In this manner, the disclosed systems and methods may recommend devices to connect at the building, making the devices and/or appliances of the building operate more efficiently and/or adding security to the building.

18 Claims, 3 Drawing Sheets

(56) References Cited

U.S. PATENT DOCUMENTS

2019/0278442 A1\* 9/2019 Liang .................... G06F 3/0484
2020/0167834 A1\* 5/2020 Matsuoka .......... G06Q 30/0278

\* cited by examiner

SYSTEMS AND METHODS FOR DEVICE RECOMMENDATION

CROSS REFERENCE TO RELATED APPLICATIONS

This application claims priority from and the benefit of U.S. Provisional Application Ser. No. 62/838,525, entitled "Systems and Methods for Device Recommendation," filed Apr. 25, 2019, which is hereby incorporated by reference in its entirety for all purposes.

BACKGROUND

The present disclosure relates generally to devices connected at a home, office, or other building, and more particularly to systems and methods for recommending devices to connect at the building.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

A device may be connected, installed, or added at a home, office, or other building. For example, the device may include a detector (e.g., of smoke, carbon monoxide, water, temperature, humidity, and so on), an appliance, a security device, a smart device, and the like. It is now recognized that systems and methods for recommending devices to connect at the building (e.g., based on the devices already connected to the building) are desirable.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
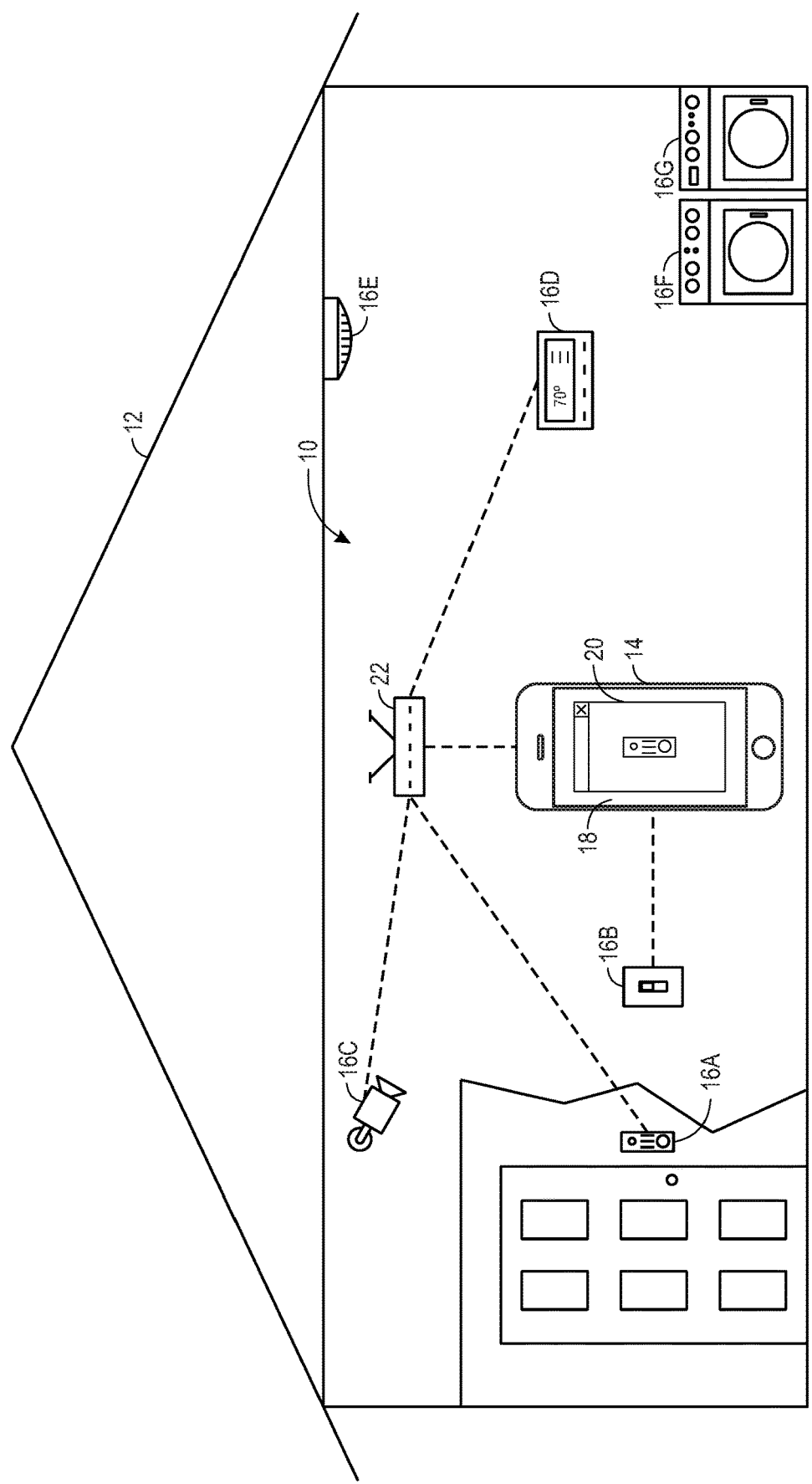
FIG. 1 is a perspective view of a device recommendation system used in a building, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

It is now recognized that it may be desirable to recommend devices for a home, office, or other building. A device may be connected, installed, or added at a home, office, or other building. For example, the device may include a thermostat, smoke detector, carbon monoxide detector, security camera, nanny camera, doorbell camera, light switch, garage opener, appliance, window, dehumidifier, water detector, moisture detector, leak detector, and so on. The device may include a smart device, which is an electronic device that performs a function and is communicatively coupled to another electronic device (such as a smartphone or computing device) to enable the other electronic device to at least partially operate the smart device.

The present disclosure relates generally to recommending devices to connect, install, or add to a home, office, or other building. In particular, a controller of a smartphone or computing device may determine the devices that are currently connected at the building. Based on at least the devices currently connected at the building, the controller may determine recommended devices to install. The controller may then recommend the recommended devices. In some embodiments, the controller may also determine property information of the building. The property information may be any suitable information that is related to recommending devices to connect at the building. For example, the property information may include dimensions and/or layout information of the building (e.g., square footage, number of rooms, number of bedrooms, whether the building has a garage, and the like), atmospheric conditions in the building (e.g., temperature or humidity), outside atmospheric conditions near the building (e.g., temperature or humidity), crime-related statistics near the building, resource usage by devices and/or appliances of the building (e.g., electricity, gas, and/or water usage), and so on. The controller may determine recommended devices to install based on the property information and/or the devices currently connected at the building. The controller may then recommend appropriate devices. In this manner, the disclosed systems and methods may recommend devices to connect, install, or add to the building, making the devices and/or appliances of the building operate more efficiently and/or adding security to the building.

As an introduction, FIG. 1 is a perspective view of a device recommendation system 10 used in a building 12, according to an embodiment of the present disclosure. The building 12 may include any structure that uses devices such as those listed above, including a house, home, apartment, commercial building, industrial building, and so on. The system 10 includes a computing device 14 that may be any suitable electronic device that may communicate with and/or operate a device 16. For example, the computing device 14 may include a smartphone, a wearable electronic device, a tablet, a laptop, a computer, and so on. The system 10 also includes a variety of devices 16 connected, installed, or added at the building 12. It should be understood that the terms "connected", "installed", "added", "detected", and so on, in reference to a device at the building 12, each mean that the device is disposed in, at, or near the building 12, and capable of being operated or performing its normal operation, and may not be physically attached to building 12. As illustrated, the connected devices 16 may include a doorbell camera 16A, light switch 16B, security camera 16C, thermostat 16D, smoke detector 16E, washer 16F, and dryer 16G. Though certain connected devices 16 are illustrated, it should be understood that any suitable device 16 is contemplated such as a carbon monoxide detector, nanny camera, garage opener, appliance, window, dehumidifier, water detector, moisture detector, leak detector, and so on.

In some embodiments, at least some of the connected devices (e.g., 16A-D) may be smart devices. In such embodiments, the computing device 14 may communicatively couple to the connected smart devices 16A-D (as illustrated by the dashed lines in FIG. 1) and at least partially operate the connected smart devices 16A-D. As an example, to at least partially operate the connected smart devices 16A-D, the computing device 14 may include an electronic display 18 and a user interface 20 that enables a user to view settings of, manage, and/or at least partially operate the connected smart devices 16A-D. In some embodiments, the computing device 14 may also be accessible to view, manage or operate smart devices 16A-D via a separate a connected device, such as a smart phone or other similar device, and have no built-in electronic display or other external control capability.

The connected smart devices 16A-D may be communicatively coupled to the computing device 14 via any suitable communication protocol, such as WiFi, infrared, Ethernet, Bluetooth, Thread, ZigBee, Z-Wave, KNX, and so on. In some embodiments, a connected smart device (e.g., 16A, 16C-D) may be communicatively coupled to the computing device 14 via a communication hub 22. For example, the communication hub 22 may be a WiFi router, and the connected smart thermostat 16D may communicatively couple to the computing device 14 via the WiFi router. In alternative or additional embodiments, a connected smart device (e.g., 16B) may be directly and communicatively coupled to the computing device 14, e.g., without the use of a communication hub 22. For example, the connected smart light switch 16B is directly and communicatively coupled to the computing device 14 without the use of the communication hub 22.

The computing device 14 may maintain a list or database of all connected devices 16, and, as explained in further detail below, determine recommended devices to connect, install, or add to the building 12 based on the list or database. In some embodiments, a connected smart device 16A-D may include a controller that operates the connected smart device 16A-D, and a controller of the computing device 14 may communicatively couple to the controller of the connected smart device 16A-D to transfer information and/or instructions. In one embodiment, a connected smart device 16A-D may include artificial intelligence components or processes than enable the connected smart device 16A-D to sense its environment and take actions to achieve certain goals.

Figure 2:
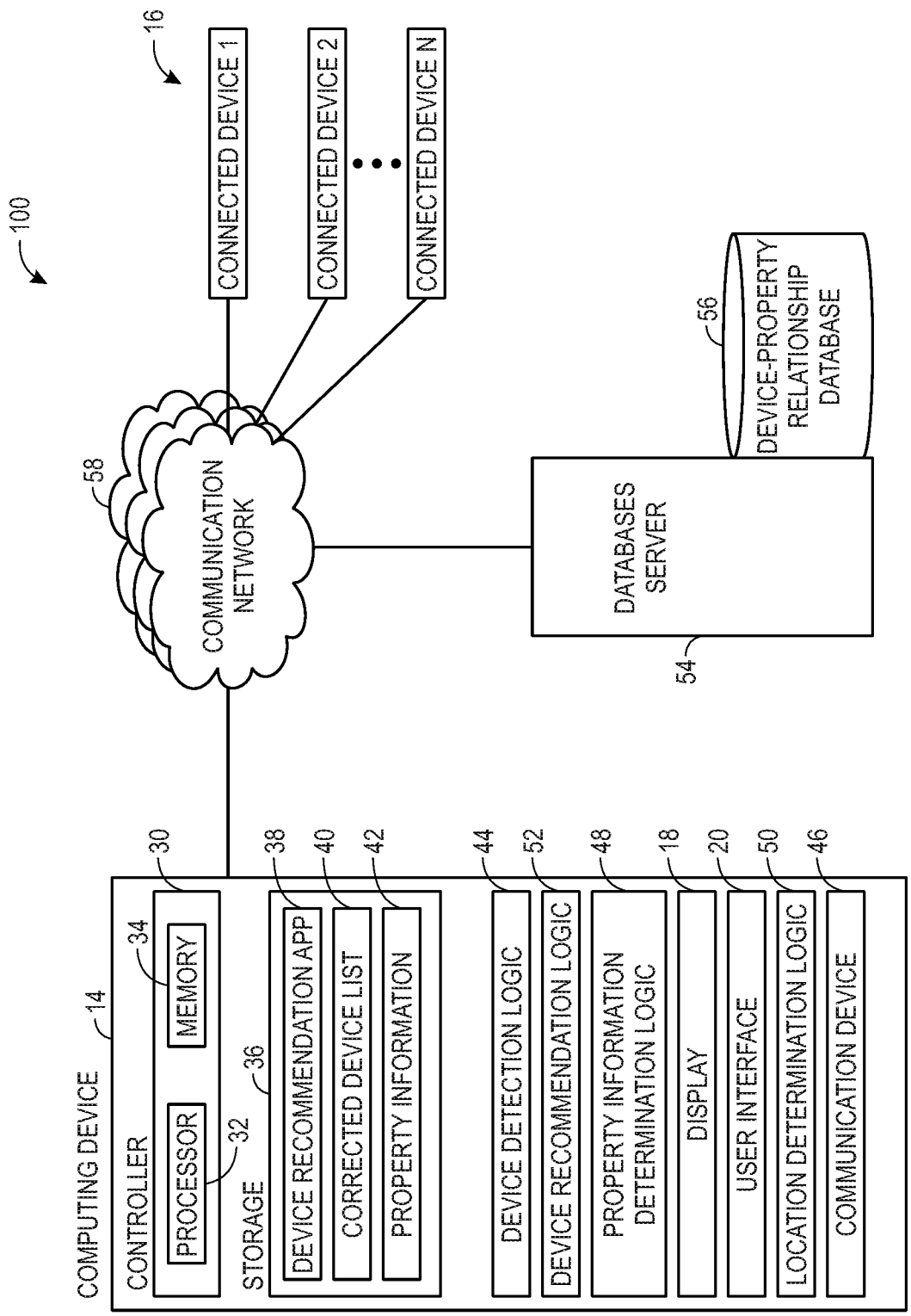
FIG. 2 is a block diagram of the device recommendation system of FIG. 1, according to an embodiment of the present disclosure.

With the foregoing in mind, FIG. 2 is a block diagram of the device recommendation system 10 of FIG. 1, according to an embodiment of the present disclosure. The computing device 14 of the device recommendation system 10 may include one or more processors (illustrated as a single processor 32) and one or more memory devices (illustrated as a single memory device 34). The processor 32 may execute software programs and/or instructions stored in the memory device 34 that facilitate recommending devices. Moreover, the processor 32 may include multiple microprocessors, one or more "general-purpose" microprocessors, one or more special-purpose microprocessors, and/or one or more application specific integrated circuits (ASICS). For example, the processor 32 may include one or more reduced instruction set (RISC) processors. The memory device 34 may store information such as control software, look up tables, configuration data, and so forth. The computing device 14 may include one or more storage devices (illustrated as a single storage device 36) that may store a device recommendation software application 38, a connected devices list 40, and property information 42. In some embodiments, the memory device 34 and the storage device 36 may be combined as a single device. The memory device 34 and the storage device 36 may each include a tangible, non-transitory, machine-readable-medium, such as volatile memory (e.g., a random access memory (RAM)), nonvolatile memory (e.g., a read-only memory (ROM)), flash memory, one or more hard drives, and/or any other suitable optical, magnetic, or solid-state storage medium. The memory device 34 and the storage device 36 may each store a variety of information and may be used for various purposes. For example, the storage device 36 may store machine-readable and/or processor-executable instructions (e.g., firmware or software) for the processor 32 to execute, such as instructions that facilitate recommending devices.

The storage device 36 may store the device recommendation application 38 that includes instructions which, when executed by the processor 32, facilitate recommending devices to connect to the building 12. The storage device 36 may also store the connected device list or database 40 that stores devices 16 that are or have been connected at the building 12. In some embodiments, the device recommendation application 38 may enable adding, entering, replacing, and/or removing connected devices 16 to or from the connected device list 40 or confirming the presence of connected devices 16 on the connected device list 40.

In some embodiments, the computing device 14 may include device detection logic 44 that may (e.g., automatically) determine and/or detect connected devices 16 in the building 12. For example, the device detection logic 44 may enable a user to add or enter (e.g., manually via the user interface 20) the washing machine 16F to the connected device list 60. In alternative or additional embodiments, the device detection logic 44 may use third party data to determine connected devices 16 to add to the connected device list 60. For example, the device recommendation application 38 may receive connected device information from a home insurance company, home valuation company, device warranty company, or the like (e.g., via a communication device 46 of the computing device 14). The device recommendation application 38 may then add a connected device 16 to the connected device list 60 based on the received connected device information, or request that the user confirm that the connected device 16 is connected at the building 12 based on the received connected device information (e.g., via the user interface 20).

In some embodiments, the device detection logic 44 may instruct or use the communication device 46 of the computing device 14 to search for connected smart devices 16A-D in the building 12. If any connected smart devices 16A-D are found, the device recommendation application 38 may add the connected smart devices 16A-D to the connected device list 40 or prompt a user to confirm that the connected smart devices 16A-D should be added to the connected device list 40.

The connected device list 40 may store any suitable information relevant to the connected devices 16, such as model numbers, colors, serial numbers, installation dates, manufacturing dates, expirations dates, battery replacement dates, software or firmware updates, compliance information, information related to operation in conjunction with other devices (including other connected devices), whether the connected device 16 is a smart device (e.g., 16A-D), and so on. It should be understood that the term "logic" as used in the present disclosure may include hardware (e.g., circuitry), software (e.g., machine-readable instructions), or a combination of the two.

The storage device 36 may further store the property information 42 of the building 12. The property information 42 may be any suitable information that is related to recommending devices to connect at the building 12. For example, the property information 42 may include dimensions and/or layout information of the building 12 (e.g., square footage, number of rooms, number of bedrooms, whether the building has a garage, and the like), atmospheric conditions in the building 12 (e.g., temperature or humidity), outside atmospheric conditions near the building 12 (e.g., temperature or humidity), crime-related statistics near the building 12, resource usage by devices and/or appliances of the building 12 (e.g., electricity, gas, and/or water usage), and so on. In some embodiments, the device recommendation application 38 may enable adding the property information 42 of the building 12 or confirming property information 42 of the building 12. For example, the device recommendation application 38 may enable a user to add (e.g., manually) the square footage of the building 12 and store the square footage as property information 42. In alternative or additional embodiments, the computing device 14 may include property information detection logic 48 that may determine and/or detect property information 42 of the building 12. In particular, the device detection logic 44 may instruct or use the communication device 46 and/or location determination logic 50 of the computing device 14 to determine the property information 42 of the building 12. For example, the property information detection logic 48 may receive atmospheric conditions in the building 12 (e.g., temperature or humidity) from a device in the building 12, such as the thermostat 16D. The device recommendation application 38 may then store the atmospheric conditions as property information 42. As another example, the property information detection logic 48 may receive a location of the building 12 via the location determination logic 50, and determine outside atmospheric conditions based on the location of the building 12 (e.g., temperature or humidity) using the communication device 46.

The computing device 14 may also include device recommendation logic 52 which may determine recommended devices to add to the building 12. The device recommendation logic 52 may receive as input the devices 16 connected or detected at the building 12 (e.g., as stored in the connected devices list 40). In some cases, based on the input of the devices 16 connected or detected at the building 12, the device recommendation logic 52 may determine recommended devices to connect at the building 12. In one embodiment, the device recommendation logic 52 may recommend devices that are not already connected or detected at the building 12. For example, if the device detection logic 44 determines that the building 12 does not have a smoke detector (e.g., 16E) installed, then the device recommendation logic 52 may recommend connecting or installing a smoke detector. In another embodiment, the device recommendation logic 52 may recommend devices that work in conjunction with the devices 16 currently connected or detected in the building 12. For example, if the device detection logic 44 determines that the building 12 has a washing machine (e.g., 16F) installed, the device recommendation logic 52 may recommend connecting or installing a dryer (e.g., 16G). As another example, if the device detection logic 44 determines that the building 12 has a washing machine (e.g., 16F) connected, and the device recommendation logic 52 determines that the washing machine is likely to increase moisture and/or humidity in the building 12 (e.g., due to normal operation and/or information indicating that the respective device expels an excessive amount of moisture and/or is prone to leaking), then the device recommendation logic 52 may recommend connecting or installing a dehumidifier and/or leak detector.

In yet another embodiment, the device recommendation logic 52 may recommend replacement of devices that are already connected, installed, or detected in the building 12. For example, the device detection logic 44 may determine that the building 12 has a smoke detector (e.g., 16E) connected, and the device recommendation logic 52 may determine that the smoke detector is past an expiration date. As such, the device recommendation logic 52 may recommend replacement of the smoke detector (e.g., and, in some cases, suggest a certain smoke detector model to replace the expired smoke detector). In other examples, any suitable reason to replace a connected device is contemplated, such as replacement due to recall, inability of or inefficiency when operating with other devices (including other connected devices), and so on. Moreover, the device recommendation logic 52 may recommend connecting a certain number of the device (e.g., a smoke detector 16E in every room), a location to install the device (e.g., a doorbell camera 16A next to the front door of the building 12), and so on.

An indication of the recommended devices may be received by the device recommendation application 38, which may then display the recommended devices on the display 18 of the computing device via the user interface 20. For example, using FIG. 1 as an example, the device detection logic 44 may determine the devices 16A-G connected at the building 12, and, because the building 12 does not appear to have a carbon monoxide detector connected, the device recommendation logic 52 may determine that a carbon monoxide detector should be recommended to be connected at the building 12.

Alternatively or additionally, the device recommendation logic 52 may determine recommended devices to connect at the building 12 based on the property information 42 of the building 12. In some embodiments, the device recommendation logic 52 may compare the property information 42 to a threshold value, and recommend devices based on the comparison. For example, the property information detection logic 48 may determine that there is typically or on average excessive or higher than average humidity in the building 12 (e.g., exceeds a threshold humidity value). The device recommendation logic 52 may receive this information, and determine that devices that promote efficient moisture or water usage, or otherwise decrease humidity in the building 12, should be recommended to be connected at the building 12. As such, the device recommendation logic 52 may determine that smart washers (e.g., 16F), smart faucets, smart showerheads, dehumidifiers, water detectors, moisture detectors, leak detectors, and so on, should be recommended to be installed at the building 12.

As another example, the property information detection logic 48 may determine the square footage and/or the number of rooms in the building 12. The device recommendation logic 52 may receive this information, and determine that a certain number of devices associated with the size of the building 12 should be recommended to be connected at the building 12. For instance, the device recommendation logic 52 may determine that a certain number of smoke detectors (e.g., 16E) or carbon monoxide detectors should be installed per square footage and/or number of rooms of the building. In some embodiments, the device recommendation logic 52 may determine the number of a certain type of devices (e.g., smoke detectors 16E) that are already connected at the building 12, determine the difference between the recommended number of the certain type of devices and the connected number of the certain type of devices, and recommended connecting the difference of the certain type of devices.

As yet another example, the property information detection logic 48 may determine that there is typically or on average excessive or higher than average energy or heating, ventilation, and air conditioning (HVAC) usage by the building 12 (e.g., exceeds a threshold energy or HVAC usage value). The device recommendation logic 52 may receive this information, and determine that devices that promote efficient energy or HVAC usage, or otherwise decrease energy or HVAC usage in the building 12, should be recommended to be connected at the building 12. As such, the device recommendation logic 52 may determine that thermostats (e.g., 16D), smart fans, smart air conditioning units, smart heaters, and so on, should be recommended to be connected at the building 12.

As another example, the location detection logic 50 may determine the location of the building 12, and the property information determination logic 48, in conjunction with the communication device 46, may determine that the location is in an area associated with higher than average crime or security issues. The device recommendation logic 52 may receive this information, and determine that devices that increase the security of and/or help a user monitor the building 12 should be recommended to be connected at the building 12. As such, the device recommendation logic 52 may determine that doorbell cameras (e.g., 16A), smart light switches (e.g., 16B), lights, security cameras (e.g., 16C), smart windows, smart garage openers, and so on, should be recommended to be installed at the building 12. An indication of the recommended devices may be received by the device recommendation application 38, which may then output the recommended devices.

For example, the controller 30 may display the recommended devices on the display 18 of the computing device via the user interface 20. In additional or alternative embodiments, the controller 30 may send a notification and/or provide an alert in the form of electronic mail, a Short Message Service (SMS) text message, or the like, to a user. In one embodiment, the controller 30 may provide hyperlinks and/or cause the display 18 to display the recommended devices as offered for sale by vendors (e.g., e-commerce websites). This may be performed by accessing websites on the Internet via the communication device 46 and/or the communication network 58. For example, if the recommended device is a smart light switch (e.g., 16B) due to the building not having a smart light switch in a room, the controller 30 may provide a hyperlink to an e-commerce website that offers a smart light switch for sale. In some embodiments, the controller 30 may place the recommended device in a virtual shopping cart of the e-commerce website. In some cases, the controller 30 may have access to the user's profile on the e-commerce website (e.g., as stored in the memory device 34 and/or the storage device 36), and, as such, may place the recommended device in a virtual shopping cart of the e-commerce website associated with the user's profile on the e-commerce website.

Similarly, the controller 30 may provide contact information (e.g., by displaying the contact information on the display 18, sending a notification and/or provide an alert in the form of electronic mail, a Short Message Service (SMS) text message, or the like) of a service provider or installer to install the recommended device, repair a connected device that may be not operating correctly, maintain a connected device if a service date is passed, and so on. For example, the controller 30 may open a phone dialing software application on a user's mobile device (e.g., via the communication device 46 and/or the communication network 58), an SMS software application on the user's mobile device, an electronic mail software application on the user's mobile device or computing device (e.g., 14), or the like, to more conveniently enable the user to contact the service provider or installer.

In some cases, the device recommendation logic 52 may also receive an indication of the devices 16 currently connected at the building 12 (e.g., as stored in the connected devices list 40), and may exclude or not recommended those devices 16 that are already connected as such recommendations may be redundant. In such cases, the device recommendation logic 52 may additionally or alternatively determine whether a redundancy exists, and/or whether connecting the same device would be redundant. That is, even if the same device is already connected at the building 12, the device recommendation logic 52 may determine whether it is beneficial to have multiple of the same devices 16 connected at the building 12. In particular, certain devices may be useful when multiples of those devices are placed at different locations (e.g., doorbell cameras 16A, light switches 16B, security cameras 16C, thermostats 16D, smoke detectors 16E, carbon monoxide detectors, nanny cameras, garage openers, appliances, windows, dehumidifiers, water detectors, moisture detectors, leak detectors). In some embodiments, the storage device 36 and/or a database server 54 may store a list of devices for which multiples of such devices would be beneficial. In additional or alternative embodiments, the controller 30 may employ machine-learning techniques and/or artificial intelligence to determine when multiples of such devices would be beneficial.

For example, the device recommendation logic 52 may determine that a security camera 16C should be connected at the building 12, and that the building 12 already has a security camera 16C connected. The device recommendation logic 52 may then determine to recommend connecting a new security camera 16C (in addition to the already installed security camera 16C), because installing the new security camera 16C may not be redundant, as the new security camera 16C may be connected at another portion (e.g., at the exterior, interior, or another room) of the building 12, and still increase the security of and/or help a user monitor the building 12. In this manner, the device recommendation system 10 may recommend devices to connect at the building 12, making the devices and/or appliances of the building 12 operate more efficiently and/or adding security to the building 12.

In some embodiments, the storage device 36 and/or a database server 54 may store a device-property information relationship database, list, and/or table 56. The device-property information relationship database 56 may correlate a device 16 with certain property information 42. For example, the device-property information relationship database 56 may correlate a security camera 16C with increasing security at the building 12, a thermostat 16D with promoting efficient energy, a dehumidifier with decreasing moisture in the air of the building 12, and so on. As another example, the device-property information relationship database 56 may correlate a washer 16F, a faucet, or a showerhead with increasing moisture and/or humidity in the building 12 (e.g., due to normal operation and/or information indicating that the respective device expels an excessive amount of moisture and/or is prone to leaking). In cases where the device-property information relationship database 56 is stored in a database server 54, the device recommendation logic 52 may access the device-property information relationship database 56 to facilitate determining recommended devices to connect at the building 12 using the communication device 46. For example, the device recommendation logic 52 may use the communication device 46 to access a communication network to communicatively couple to the database server 54 and receive information from the device-property information relationship database 56.

While the device detection logic 44, the property information detection logic 48, and the device recommendation logic 52 are illustrated as separated from the device recommendation application 38, it should be understood that, in some embodiments, any combination of the device detection logic 44, the property information detection logic 48, and the device recommendation logic 52 may be part of the device recommendation application 38. Moreover, the controller 30 of the computing device 14 and/or the device recommendation application 38 may operate any combination of the device detection logic 44, the property information detection logic 48, and the device recommendation logic 52, the location determination logic 50, the communication device 46, and the user interface 20.

As noted above, the computing device 14 may include the location determination logic 50, which may determine the location of the building 12. In some cases, the device recommendation application 38 may prompt a user to enter an address of the building 12 in the user interface 20 or ask the user to confirm the address of the building 12 based on the user entering the address in another context (e.g., when setting up a user profile associated with the computing device 14 and/or a device 16). The location determination logic 50 may then determine the location of the building 12 based on the address (e.g., via the communication device 46). In additional or alternative cases, the location determination logic 50 may communicatively couple to any suitable location system (such as a global position system (GPS)) to determine the location of the computing device 14, and ask the user to confirm whether the location of the computing device 14 corresponds to the location of the building 12. The location determination logic 50 may then determine the location of the building 12 based on the location of the computing device 14.

Also as noted above, the computing device 14 may include the communication device 46 that may enable the controller 30 to communicate with any suitable communication network 58 (e.g., and thus communicate with certain devices 16). For example, the communication device 46 may enable the controller 30 to communicate with a communication network 58 of any suitable communication protocol (e.g., WiFi, infrared, Ethernet, Bluetooth, Thread, ZigBee, Z-Wave, KNX, LAN, WAN, Internet, or mobile). In this manner, the communication device 14 may enable the controller 30 to communicate with, for example, certain devices 16.

Figure 3:
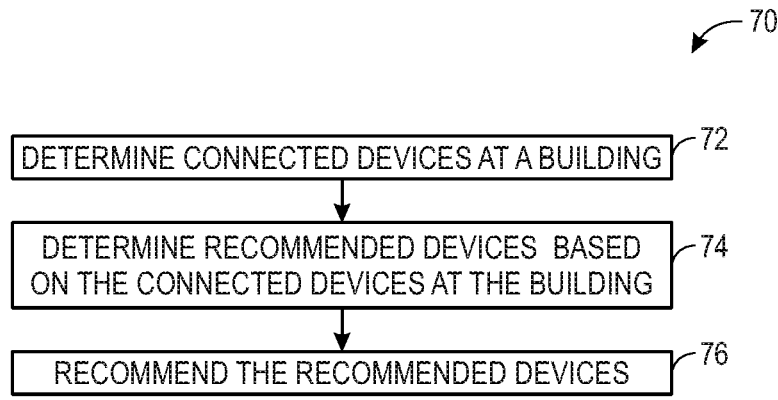
FIG. 3 is a flowchart illustrating a method for recommending devices based on devices currently connected at the building of FIG. 1, according to an embodiment of the present disclosure.

FIG. 3 is a flowchart illustrating a method 70 for recommending devices based on devices 16 currently connected at the building 12, according to an embodiment of the present disclosure. The method 70 may be performed by any suitable device that may recommend devices 16, such as the processor 32. While the method 70 is described using steps in a specific sequence, it should be understood that the present disclosure contemplates that the described steps may be performed in different sequences than the sequence illustrated, and certain described steps may be skipped or not performed altogether. In some embodiments, the method 70 may be implemented by executing instructions stored in a tangible, non-transitory, computer-readable medium, such as the memory device 34, using a processor, such as the processor 32.

As illustrated, in block 72, the processor 32 determines or receives the devices 16 currently connected at the building 12. Specifically, the processor 32 may instruct or use the device detection logic 44 to determine and/or detect devices 16 already connected in the building 12.

In block 74, the processor 32 then determines recommended devices based on the devices 16 currently connected at the building 12. Specifically, the processor 32 may instruct or use the device recommendation logic 52 to determine recommended devices to connect to the building 12. In one example, the device recommendation logic 52 may recommend those devices that are not already connected at the building 12. In some embodiments, the processor 32 may not recommend those recommended devices that are already connected as such recommendations may be redundant. For example, if the device recommendation logic 52 determines that a washer (e.g., 16F) should be recommended to be connected at the building 12, and the device detection logic 44 determines that a washer is already connected at the building 12, then the processor 32 may not recommend that a washer be connected at the building 12. However, in some cases, recommending devices to be connected that are already connected at the building 12 may not be redundant. As such, the device recommendation logic 52 may determine whether recommending connecting a device that is already installed in the building 12 would be redundant. For example, if a building 12 has multiple HVAC zones that enable difference HVAC (e.g., temperature) settings to be configured in each HVAC zone, and a first HVAC zone has a corresponding thermostat (e.g., 16D) installed in the building 12, but a second HVAC zone does not, then the device recommendation logic 52 may recommend connecting another thermostat, despite the thermostat being connected at the building 12.

In block 76, the processor 32 recommends the recommended devices. In particular, the processor 32, via the device recommendation application 38, may display the recommended devices on the user interface 20 presented on the electronic display 18 of the computing device 14. In this manner, the method 70 may recommend devices to connect at the building 12, making the devices and/or appliances of the building 12 operate more efficiently and/or adding security to the building 12.

Figure 4:
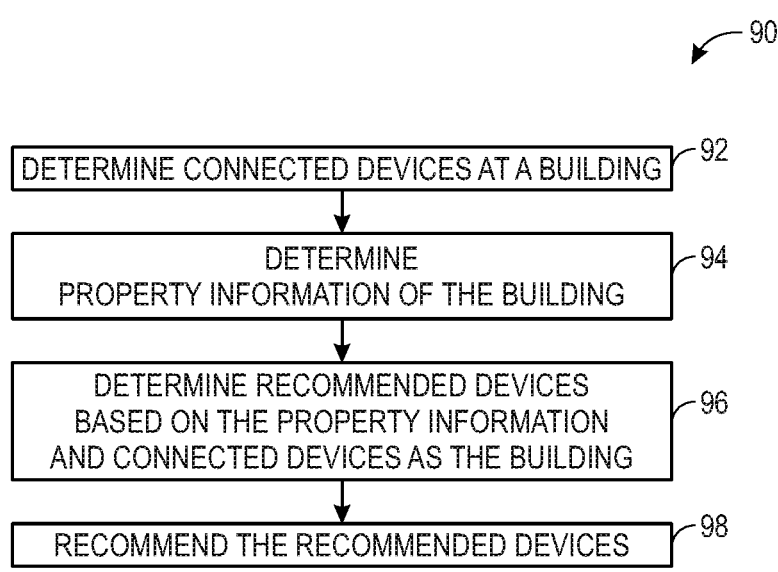
FIG. 4 is a flowchart illustrating a method for recommending devices based on property information of the building of FIG. 1 and devices currently connected at the building, according to an embodiment of the present disclosure.

FIG. 4 is a flowchart illustrating a method 90 for recommending devices based on property information of the building 12 and devices 16 currently connected at the building 12, according to an embodiment of the present disclosure. The method 90 may be performed by any suitable device that may determine property information of the building 12 and recommend devices 16, such as the processor 32. While the method 90 is described using steps in a specific sequence, it should be understood that the present disclosure contemplates that the described steps may be performed in different sequences than the sequence illustrated, and certain described steps may be skipped or not performed altogether. In some embodiments, the method 90 may be implemented by executing instructions stored in a tangible, non-transitory, computer-readable medium, such as the memory device 34, using a processor, such as the processor 32.

As illustrated, in block 92, the processor 32 determines or receives the devices 16 currently connected at the building 12. Specifically, the processor 32 may instruct or use the device detection logic 44 to determine and/or detect devices 16 already connected at the building 12.

In block 94, the processor 32 determines or receives property information 42 of the building 12. Specifically, the processor 32 may instruct or use the property information detection logic 48 to determine and/or detect property information 42 of the building 12. The property information 42 may include any suitable information that is related to recommending devices to install at the building 12, such as dimensions and/or layout information of the building 12 (e.g., square footage, number of rooms, number of bedrooms, whether the building has a garage, and the like), atmospheric conditions in the building 12 (e.g., temperature or humidity), outside atmospheric conditions near the building 12 (e.g., temperature or humidity), crime-related statistics near the building 12, resource usage by devices and/or appliances of the building 12 (e.g., electricity, gas, and/or water usage), and so on. In some embodiments, the device detection logic 44 may instruct or use the communication device 46 and/or location determination logic 50 of the computing device 14 to determine the property information 42 of the building 12. For example, the property information detection logic 48 may receive atmospheric conditions in the building 12 (e.g., temperature or humidity) from a device in the building 12, such as the thermostat 16D. The device recommendation application 38 may then store the atmospheric conditions as property information 42. As another example, the property information detection logic 48 may receive a location of the building 12 via the location determination logic 50, and determine outside atmospheric conditions based on the location of the building 12 (e.g., temperature or humidity) using the communication device 46.

In block 96, the processor 32 then determines recommended devices based on the property information 42 and the devices 16 currently connected at the building 12. Specifically, the processor 32 may instruct or use the device recommendation logic 52 to determine recommended devices to connect at the building 12. As such, the processor 32 may determine recommended devices based on dimensions and/or layout information of the building 12 (e.g., square footage, number of rooms, number of bedrooms, whether the building has a garage, and the like), atmospheric conditions in the building 12 (e.g., temperature or humidity), outside atmospheric conditions near the building 12 (e.g., temperature or humidity), crime-related statistics near the building 12, and/or resource usage by devices and/or appliances of the building 12 (e.g., electricity, gas, and/or water usage). Moreover, as discussed above, the processor 32 may not recommended those recommended devices that are already connected as such recommendations may be redundant. However, in some cases, recommending devices to be connected that are already connected at the building 12 may not be redundant. As such, the device recommendation logic 52 may determine whether recommending connecting a device that is already connected at the building 12 would be redundant.

In block 98 the processor 32 recommends the recommended devices. In particular, the processor 32, via the device recommendation application 38, may display the recommended devices on the user interface 20 presented on the electronic display 18 of the computing device 14. In this manner, the method 90 may recommend devices to connect to the building 12, making the devices and/or appliances of the building 12 operate more efficiently and/or adding security to the building 12.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system that recommends devices to connect at a building, wherein the system comprises:
a computing device communicatively coupled to one or more connected devices that are connected at the building, wherein the computing device comprises:
a graphical display; and
a controller comprising a processor and a memory device, wherein the processor, when executing instructions stored in the memory device, is configured to:
determine the one or more connected devices connected at the building;
determine one or more recommended devices to be connected at the building based on the one or more connected devices connected at the building, wherein the one or more recommended devices comprise a thermostat, a smoke detector, a carbon monoxide detector, a washer, a dryer, a fan, an air conditioning unit, a heater, a faucet, a showerhead, a dehumidifier, a water detector, a moisture detector, or a leak detector, or any combination thereof;
cause the graphical display to display a notification including a first recommendation of the one or more recommended devices to be connected at the building via the graphical display and a second recommendation indicative of a service provider to install the one or more recommended devices; and open a communication application to contact the service provider to install the one or more recommended devices.

2. The system of claim 1, wherein the processor, when executing the instructions stored in the memory device, is configured to determine property information associated with the building.

3. The system of claim 2, wherein the processor, when executing the instructions stored in the memory device, is configured to determine the one or more recommended devices to be connected at the building based on the property information and the one or more connected devices connected at the building.

4. The system of claim 2, wherein the property information comprises dimensions of the building, layout information of the building, one or more atmospheric conditions in the building, one or more outside atmospheric conditions near the building, one or more crime-related statistics near the building, resource usage by devices or appliances of the building, or any combination thereof.

5. The system of claim 1, wherein the computing device comprises a smartphone, a wearable electronic device, a tablet, a laptop, or a computer.

6. The system of claim 1, comprising the one or more connected devices including a doorbell camera, a light switch, a security camera, an additional thermostat, an additional smoke detector, an additional carbon monoxide detector, an additional washer, an additional dryer, an additional fan, an additional air conditioning unit, an additional heater, an additional faucet, an additional showerhead, or any combination thereof.

7. The system of claim 1, comprising the one or more connected devices including a smart device.

8. The system of claim 1, wherein the one or more recommended devices comprises a smart device.

9. The system of claim 1, wherein the processor, when executing the instructions stored in the memory device, is configured to exclude a device as the one or more recommended devices in response to determining that the one or more connected devices connected at the building comprises the device.

10. One or more tangible, non-transitory, machine-readable media, comprising machine-readable instructions configured to cause a processor to:

receive sensor data from one or more sensors associated with a building, wherein the sensor data is indicative of one or more atmospheric conditions in the building;

determine whether a humidity level in the building exceeds a humidity threshold value based on the sensor data;

determine one or more recommended devices to be connected at the building in response to determining that the humidity level exceeds the humidity threshold value, wherein the one or more recommended devices are configured to decrease the humidity in the building;

provide an indication of the one or more recommended devices to a computing device communicatively coupled to one or more connected devices connected at the building, wherein the indication is configured to be displayed on an electronic display of the computing device and wherein the indication includes a recommendation of a service provider to install the one or more recommended devices;

add the one or more recommended devices to an e-commerce cart associated with a user based on providing the indication; and open a communication application on the computing device to contact the service provider to install the one or more recommended devices.

11. The one or more tangible, non-transitory, machine-readable media of claim 10, wherein the one or more recommended devices comprise a smart washer, a smart faucet, a smart showerhead, a dehumidifier, a water detector, a moisture detector, a leak detector, or any combination thereof.

12. The one or more tangible, non-transitory, machine-readable media of claim 10, wherein the machine-readable instructions are configured to cause the processor to:

determine a square footage or a number of rooms in the building;

determine a number of the one or more recommended devices based on the square footage or the number of rooms in the building; and provide the indication of the number of the one or more recommended devices on the electronic display.

13. The one or more tangible, non-transitory, machine-readable media of claim 10, wherein the machine-readable instructions are configured to cause the processor to:

determine an energy usage or a heating, ventilation, and air conditioning (HVAC) usage by the building;

determine that the energy usage or the HVAC usage exceeds a threshold value; and determine one or more additional recommended devices to decrease the energy usage or the HVAC usage by the building in response to determining that the energy usage or the HVAC usage exceeds the threshold value.

14. The one or more tangible, non-transitory, machine-readable media of claim 13, wherein the one or more additional recommended devices comprise a thermostat, a smart fan, a smart air conditioning unit, a smart heater, or any combination thereof.

15. A method comprising:

determining property information associated with a building, wherein the property information is indicative of a current location of the building;

determining one or more connected devices connected at the building;

determining one or more recommended devices to be connected at the building based on the property information and the one or more connected devices connected at the building, wherein the one or more recommended devices comprise a thermostat, a smoke detector, a carbon monoxide detector, a washer, a dryer, a fan, an air conditioning unit, a heater, a faucet, a showerhead, a dehumidifier, a water detector, a moisture detector, or a leak detector, or any combination thereof; and sending a notification to a computing device communicatively coupled to the one or more connected devices connected at the building, wherein the computing device is configured to display the notification on a graphical display of the computing device, the notification including a first recommendation of the one or more recommended devices to be connected at the building and a second recommendation indicative of a service provider to install the one or more recommended devices based on the current location of the building, wherein the computing device is configured to open a communication application to contact the service provider to install the one or more recommended devices.

16. The method of claim 15, comprising determining a device is redundant in response to determining that the one or more connected devices connected at the building comprises the device.

17. The method of claim 16, comprising excluding the device from the one or more connected devices in response to determining that the device is redundant.

18. The one or more tangible, non-transitory, machine-readable media of claim 10, wherein the machine-readable instructions are configured to cause the processor to:
   determine property information associated with the building, wherein the property information comprises dimensions of the building, layout information of the building, one or more crime related statistics near the building, resource usage by devices or appliances of the building, or any combination thereof, and
   determine one or more additional recommended devices to be connected at the building based on the property information.

\* \* \* \* \*